US012784753B2

(12) United States Patent
Xu et al.

(10) Patent No.: US 12,784,753 B2
(45) Date of Patent: Nov. 3, 2026

(54) METHOD AND APPARATUS FOR RECOGNIZING VOICE, ELECTRONIC DEVICE AND MEDIUM

(71) Applicant: Beijing Youzhuju Network Technology Co., Ltd., Beijing (CN)

(72) Inventors: Ling Xu, Beijing (CN); Yi He, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 718 days.

(21) Appl. No.: 18/037,546

(22) PCT Filed: Nov. 19, 2021

(86) PCT No.: PCT/CN2021/131694
§ 371 (c)(1),
(2) Date: May 17, 2023

(87) PCT Pub. No.: WO2022/105861
PCT Pub. Date: May 27, 2022

(65) Prior Publication Data

US 2024/0021202 A1 Jan. 18, 2024

(30) Foreign Application Priority Data

Nov. 20, 2020 (CN) ......................... 202011314072.5

(51) Int. Cl.
*G10L 15/26* (2006.01)
*G10L 15/02* (2006.01)
(Continued)

(52) U.S. Cl.
CPC .............. *G10L 15/26* (2013.01); *G10L 15/02* (2013.01); *G10L 25/45* (2013.01); *G10L 25/78* (2013.01); *G10L 2025/783* (2013.01)

(58) Field of Classification Search
CPC ....... G10L 15/02; G10L 15/063; G10L 15/26; G10L 2015/025; G10L 2025/783; G10L 25/45; G10L 25/78
See application file for complete search history.

(56) References Cited

U.S. PATENT DOCUMENTS 9,672,815 B2 * 6/2017 Ganapathiraju ........ G10L 15/08
10,453,434 B1 10/2019 Byrd
(Continued)

FOREIGN PATENT DOCUMENTS

CN 101308653 A 11/2008
CN 103165130 A 6/2013
(Continued)

OTHER PUBLICATIONS

International Patent Application No. PCT/CN2021/131694; Int'l Search Report; dated Feb. 23, 2022; 3 pages.
(Continued)

*Primary Examiner* — Angela A Armstrong
(74) *Attorney, Agent, or Firm* — BakerHostetler

(57) ABSTRACT

Embodiments of the disclosure disclose a method and apparatus for speech recognition, an electronic device and a medium. The method includes: acquiring an audio data to be recognized (201), the audio data to be recognized including a speech segment; determining a start and end time corresponding to the speech segment which is comprised in the audio data (202); extracting at least one speech segment from the audio data to be recognized based on the determined start and end time (203); and performing speech recognition on the at least one extracted speech segment to generate recognition text corresponding to the audio data to be recognized (204).

15 Claims, 6 Drawing Sheets

(51) Int. Cl.
*G10L 25/45* (2013.01)
*G10L 25/78* (2013.01)

(56) References Cited

U.S. PATENT DOCUMENTS

| | | | | |
|---|---|---|---|---|
| 2012/0179465 | A1 | 7/2012 | Cox et al. | |
| 2015/0340034 | A1* | 11/2015 | Schalkwyk | G10L 15/18 704/235 |
| 2017/0110146 | A1 | 4/2017 | Miyamori et al. | |
| 2020/0075012 | A1* | 3/2020 | Tian | H04R 3/005 |

FOREIGN PATENT DOCUMENTS

| | | | |
|---|---|---|---|
| CN | 105654947 | A | 6/2016 |
| CN | 107452401 | A | 12/2017 |
| CN | 108124191 | A | 6/2018 |
| CN | 108184135 | A | 6/2018 |
| CN | 108564941 | A | 9/2018 |
| CN | 109473123 | A | 3/2019 |
| CN | 109584896 | A | 4/2019 |
| CN | 109727597 | A | 5/2019 |
| CN | 110335612 | A | 10/2019 |
| CN | 111050201 | A | 4/2020 |
| CN | 111462735 | A | 7/2020 |
| CN | 111476615 | A | 7/2020 |
| CN | 111883139 | A | 11/2020 |
| JP | 2018-072697 | A | 5/2018 |
| WO | WO 2014/069443 | A1 | 5/2014 |
| WO | WO 2019/052337 | A1 | 3/2019 |

OTHER PUBLICATIONS

Decision of Rejection for Chinese Patent Application No. 202011314072.5, dated Nov. 19, 2024, 20 pages.

* cited by examiner

METHOD AND APPARATUS FOR RECOGNIZING VOICE, ELECTRONIC DEVICE AND MEDIUM

CROSS REFERENCE TO RELATED APPLICATIONS

The disclosure is the U.S. National Stage of International Application No. PCT/CN2021/131694, titled "METHOD AND APPARATUS FOR RECOGNIZING VOICE, ELECTRONIC DEVICE AND MEDIUM", filed on Nov. 19, 2021, which claims priority to Chinese Patent Application No. 202011314072.5, filed on Nov. 20, 2020, titled "METHOD AND APPARATUS FOR RECOGNIZING VOICE, ELECTRONIC DEVICE AND MEDIUM", the entire contents of which are incorporated herein by reference.

FIELD

Embodiments of the disclosure relate to the technical field of computers, and in particular to a method and apparatus for speech recognition, an electronic device and a medium.

BACKGROUND

With the rapid development of an artificial intelligence technology, a speech recognition technology is also becoming more and more widely used. For example, the field of speech interaction on smart devices, as well as the field of content review on audio, short video and live streaming all rely on results of speech recognition.

A related approach is to use various existing speech recognition models to perform feature extraction and acoustic state recognition of an audio data to be recognized, and to output corresponding recognition text by means of a language model.

SUMMARY

Embodiments of the disclosure provide a method and apparatus for speech recognition, an electronic device and a medium.

The first aspect of the disclosure provides a method for speech recognition, comprising: acquiring an audio data to be recognized, the audio data to be recognized comprising a speech segment; determining a start and end time corresponding to the speech segment which is comprised in the audio data to be recognized; extracting at least one speech segment from the audio data to be recognized based on the determined start and end time; and performing speech recognition on the at least one extracted speech segment to generate recognition text corresponding to the audio data to be recognized.

The second aspect of the disclosure provides an apparatus for speech recognition, comprising: an acquisition unit, configured to acquire an audio data to be recognized, the audio data to be recognized comprising a speech segment; a first determination unit, configured to determine a start and end time corresponding to the speech segment which is comprised in the audio data to be recognized; an extraction unit, configured to extract at least one speech segment from the audio data to be recognized based on the determined start and end time; and a generation unit, configured to perform speech recognition on the at least one extracted speech segment to generate recognition text corresponding to the audio data to be recognized.

The third aspect of the disclosure provides an electronic device, comprising: at least one processor; and at least one memory communicatively coupled to the at least one processor and storing instructions that upon execution by the at least one processor cause the processor to perform the method as described in any of the embodiments of the first aspect.

The fourth aspect of the disclosure provides computer-readable medium, storing program instructions that upon execution by a processor, cause the processor to perform the method as described in any of the embodiments of the first aspect.

BRIEF DESCRIPTION OF THE DRAWINGS

Other features, objectives and advantages of the disclosure will become more apparent from a reading of the detailed description of non-limiting embodiments made with reference to the following accompanying drawings.

DETAILED DESCRIPTION OF THE EMBODIMENTS

The disclosure is further described in detail below with reference to the accompanying drawings and embodiments. It is understandable that, the specific embodiments described here are merely used for explaining the disclosure rather than limiting the disclosure. In addition, it is to be further noted that, for ease of description, only the parts related to the disclosure are shown in the accompanying drawings.

It is to be noted that the embodiments in the disclosure and the features in the embodiments may be combined with one another without conflict. The disclosure will be described below in detail with reference to the accompanying drawings and the embodiments.

Figure 1:
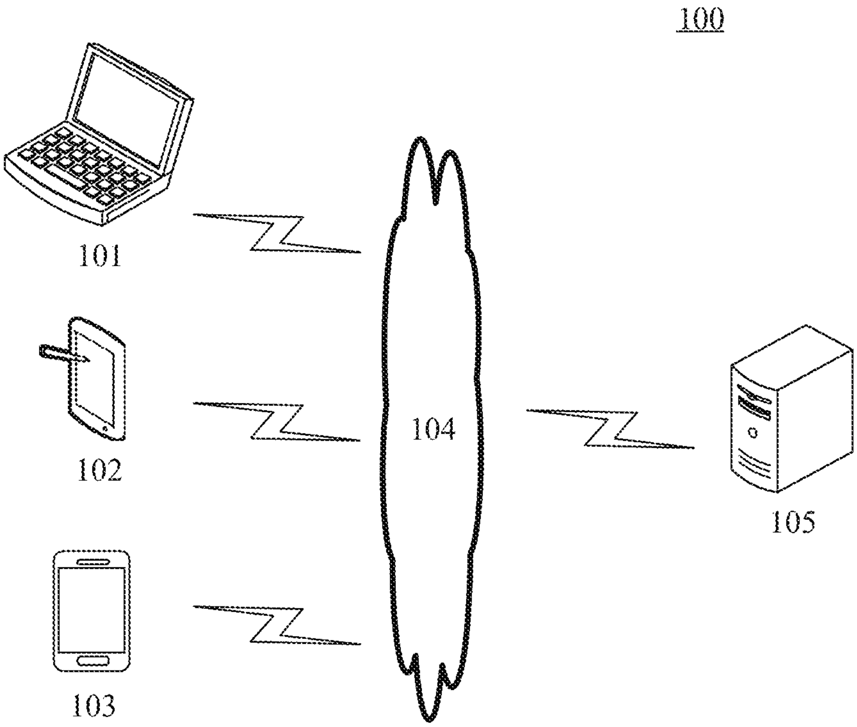
FIG. 1 is an architecture diagram of an exemplary system to which an embodiment of the disclosure may be applied.

FIG. 1 shows an exemplary architecture 100 that may apply a method for speech recognition or an apparatus for speech recognition of the disclosure.

As shown in FIG. 1, a system architecture 100 may include terminal devices 101, 102 and 103, a network 104 and a server 105. The network 104 is configured to provide a medium for communication links between the terminal devices 101, 102 and 103 and the server 105. The network 104 may include various connection types, such as wired or wireless communication links, or fiber optic cables.

The terminal devices 101, 102 and 103 interact with the server 105 by means of the network 104, so as to receive or send a message. The terminal devices 101, 102 and 103 may be installed with various communication client applications, such as a web browser application, a shopping application, a search application, an instant-messaging tool, social platform software, a text editing application and a speech interaction application.

The terminal devices 101, 102 and 103 may be hardware or software. When being hardware, the terminal devices 101, 102 and 103 may be various electronic devices supporting speech interaction, including, but not limited to, smart phones, tablet computers, smart speakers, portable laptop computers, desk computers and the like. When being software, the terminal devices 101, 102 and 103 may be installed in the above listed electronic devices. The terminal devices may be implemented as a plurality of software or software modules (for example, software or software modules used for providing distributed services), or may be implemented as a single software or software module, which is not specifically limited here.

The server 105 may be a server providing various services, for example, a backend server providing supports to speech recognition programs operated on the terminal devices 101, 102 and 103. The backend server may analyze an acquired speech to be recognized and generate a processing result (for example, recognition text), or may feed the processing result back to the terminal devices.

It is to be noted that, the server may be hardware or software. When being the hardware, the server may be implemented as a distributed server cluster consisting of a plurality of servers, or may be implemented as a single server. When being the software, the server may be implemented as a plurality of software or software modules (for example, software or software modules used for providing distributed services), or may be implemented as a single software or software module, which is not specifically limited here.

It needs to be noted that, the method for speech recognition provided by the embodiment of the disclosure is generally executed by the server 105; and accordingly, the apparatus for speech recognition is generally provided in the server 105. Optionally, when a computing power condition is met, the method for speech recognition provided by the embodiment of the disclosure may also be executed by the terminal devices 101, 102 and 103, and accordingly, the apparatus for speech recognition may also be provided in the terminal devices 101, 102 and 103. In this case, the network 104 and the server 105 may not exist.

It should be understood that, the number of the terminal devices, the networks and the servers in FIG. 1 is merely schematic. According to an implementation requirement, there may be any number of the terminal devices, the networks and the servers.

Figure 2:
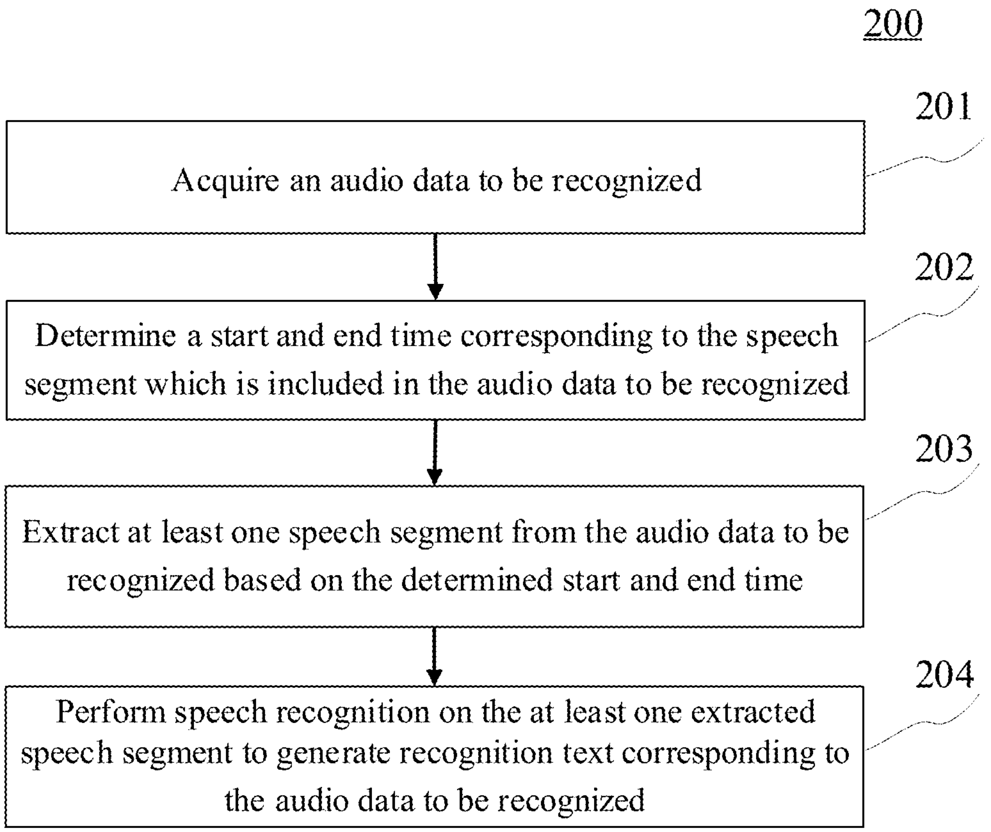
FIG. 2 is a flowchart of an embodiment of a method for speech recognition according to the disclosure.

Continuously referring to FIG. 2, showing a flow 200 of an embodiment of a method for speech recognition according to the disclosure. The method for speech recognition includes the following steps.

Step 201, an audio data to be recognized is acquired.

In this embodiment, an execution subject (for example, the server 105 shown in FIG. 1) of the method for speech recognition may acquire a speech to be recognized by means of a wired or wireless connection mode. The audio data to be recognized may include a speech segment. The speech segment may be, for example, an audio of people talking or singing. As an example, the above execution subject may locally acquire a pre-stored speech to be recognized. As another example, the above execution subject may also acquire an audio data to be recognized sent by an electronic device (for example, a terminal device shown in FIG. 1), which is in communication connection with the execution subject.

Step 202, a start and end time corresponding to the speech segment which is included in the audio data to be recognized is determined.

In this embodiment, the above execution subject may determine, in various manners, the start and end time acquired in step 201 corresponding to the speech segment which is included in the audio data to be recognized. As an example, the above execution subject may extract, by means of an endpoint detection algorithm, an audio fragment from the audio data to be recognized. Then, the above execution subject may extract an audio feature from the extracted audio fragment. Next, the above execution subject may determine a similarity between the extracted audio feature and a preset speech feature template. The preset speech feature template is obtained by extracting features of a large number of speeches of speakers. In response to determining that the similarity between the extracted audio feature and the speech feature template is greater than a predetermined threshold, the above execution subject may determine a start and end point corresponding to the extracted audio feature as the start and end time corresponding to the speech segment.

In some optional implementations of this embodiment, the execution subject may determine the start and end time corresponding to the speech segment which is included in the audio data to be recognized by means of the following steps.

At step one, an audio frame feature of the audio data to be recognized is extracted to generate a first audio frame feature.

In these implementations, the above execution subject may extract, in various manners, the audio frame feature of the audio data to be recognized that is acquired in step S201 to generate the first audio frame feature. As an example, the above execution subject may sample the audio data to be recognized and perform feature extraction on a sampled audio frame to generate the first audio frame feature. The extracted feature may include, but not limited to, at least one of the following: a Fbank feature, a Linear Predictive Cepstral Coefficient (LPCC), and a Mel Frequency Cepstrum Coefficient (MFCC).

At step two, a probability that an audio frame corresponding to the first audio frame feature belongs to a speech is determined.

In these implementations, the above execution subject may determine, in various manners, the probability that the audio frame corresponding to the first audio frame feature belongs to the speech. As an example, the above execution subject may determine the similarity between the first audio frame feature generated in step one and a preset speech frame feature template. The preset speech frame feature template is obtained by extracting frame features of a large number of speeches of speakers. In response to determining that the determined similarity is greater than the predetermined threshold, the above execution subject may determine the determined similarity as the probability that the audio frame corresponding to the first audio frame feature belongs to the speech.

Optionally, the above execution subject may input the first audio frame feature into a pre-trained speech detection model, and generate the probability that the audio frame corresponding to the first audio frame feature belongs to the speech. The speech detection model may include various neural network models used for classification. As an example, the above speech detection model may output the probability that the first audio frame feature belongs to each category (for example, speeches, ambient sound, pure music and the like).

Optionally, the above speech detection model may be obtained by training through the following steps:

S1, a first training sample set is acquired.

In these implementations, an execution subject used for training the above speech detection model may acquire the first training sample set by means of a wired or wireless connection mode. First training samples in the above first training sample set may include first sample audio frame features and corresponding sample labeling information. The above first sample audio frame features may be obtained by extracting features of first sample audios. The above sample labeling information may be used for representing a category to which the above first sample audios belong. The above category may include a speech. Optionally, the above speech may further include talking in human voice and singing in human voice. The above category may further include, for example, pure music and other sounds (for example, an ambient sound or animal sounds).

S2, an initial speech detection model for classification is acquired.

In these implementations, the above execution subject may acquire the initial speech detection model for classification by means of a wired or wireless connection mode. The above initial speech detection model may include various neural networks for audio feature classification, such as a Recurrent Neural Network (RNN), a Bi-directional Long Short Term Memory (BiLSTM) network, and a Deep Feed-Forward Sequential Memory Network (DFSMN). As an example, the above initial speech detection model may be a network with a 10-layer DFSMN structure. Each layer of the DFSMN structure may consist of a hidden layer and a memory module. The last layer of the above network may be constructed on the basis of a softmax function, and the number of output units included in the network may be the same as the number of categories classified.

S3, the first sample audio frame features in the first training sample set are taken as inputs of the initial speech detection model, labeling information corresponding to the input first audio frame features is taken as desired outputs, and the speech detection model is obtained by means of training.

In these implementations, the above execution subject may take, as the inputs of the initial speech detection model, the first sample audio frame features in the first training sample set that are acquired in step S1, take the labeling information corresponding to the input first audio frame features as the desired outputs, and obtain the speech detection model through training by means of machine learning. As an example, the above execution subject may use a Cross Entropy (CE) criteria to adjust network parameters of the initial speech detection model, so as to obtain the speech detection model.

On the basis of the optional implementations, the above execution subject may use a pre-trained speech detection model to determine whether each frame belongs to a speech frame, thereby improving a recognition accuracy of the speech frame.

At step three, the start and end time corresponding to the speech segment is generated based on comparison between the determined probability and a predetermined threshold.

In these implementations, according to the comparison between the probability determined in step two and the predetermined threshold, the above execution subject may generate the start and end time corresponding to the speech segment in various manners.

As an example, the above execution subject may first select the probability values greater than the predetermined threshold. Then, the above execution subject may determine, the start and end time of the audio fragment consisting of consecutive audio frames corresponding to the selected probability values as a start and end time of the speech segment.

On the basis of the above optional implementations, the above execution subject may determine the start and end time of the speech segment based on the probability that the audio frame in the audio data to be recognized belongs to a speech, such that the detection accuracy of the start and end time corresponding to the speech segment is improved.

Optionally, based on the comparison between the determined probability and the predetermined threshold, the above execution subject may generate the start and end time corresponding to the speech segment according to the following steps:

S1, a preset sliding window is used to select probability values corresponding to a first number of audio frames.

In these implementations, the above execution subject may use the preset sliding window to select the probability values corresponding to a first number of audio frames. A width of the preset sliding window may be preset according to an actual application scenario, for example, 10 milliseconds. The above first number may be the number of audio frames included in the preset sliding window.

S2, a statistical value of the selected probability values is determined.

In these implementations, the above execution subject may determine, in various manners, the statistical value of the probability selected in step S1. The above statistical value may be used for representing an overall amplitude of the selected probability values. As an example, the above statistical value may be a value obtained by means of weighted summation. Optionally, the above statistical value may also include, but not limited to, at least one of the following: a maximum value, a minimum value, and a median.

S3, in response to determining that the statistical value is greater than the predetermined threshold, the start and end time corresponding to the speech segment is generated based on the audio fragment consisting of the first number of audio frames corresponding to the selected probability values.

In these implementations, in response to determining that the statistical value determined in step S2 is greater than the predetermined threshold, the above execution subject may determine that the audio fragment consisting of the first number of audio frames corresponding to the selected probability values belongs to the speech segment. Therefore, the above execution subject may determine endpoint moments corresponding to the sliding window as the start and end time corresponding to the speech segment.

On the basis of the above optional implementations, the above execution subject may reduce the impact of a "noise" in an original speech on the detection accuracy of the speech segment, so as to improve the detection accuracy of the start and end time corresponding to the speech segment, thereby providing a data foundation for follow-up speech recognition.

Step 203, at least one speech segment is extracted from the audio data to be recognized based on the determined start and end time.

In this embodiment, based on the start and end time determined in step 202, the above execution subject may extract, in various manner, at least one speech segment from the audio data to be recognized. The start and end time of the above extracted speech segment is generally the same as the determined start and end time. Optionally, the above execution subject may further segment or merge the audio fragments based on the determined start and end time, so as to cause the length of the generated speech segment to be maintained within a certain range.

Step 204, speech recognition is performed on the at least one extracted speech segment to generate recognition text corresponding to the audio data to be recognized.

In this embodiment, the above execution subject may perform, by using various speech recognition technologies, speech recognition on at least one speech segment extracted in step 203 to generate recognition text corresponding to each speech segment. Then, the above execution subject may merge the generated recognition text corresponding to each speech segment to generate recognition text corresponding to the above audio data to be recognized.

In some optional implementations of this embodiment, the above execution subject may perform, speech recognition on at least one extracted speech segment to generate the recognition text corresponding to the audio data to be recognized according to the following steps.

Step one, a frame feature of a speech is extracted from the at least one extracted speech segment to generate a second audio frame feature.

In these implementations, the above execution subject may extract, in various manners, the frame feature of the speech from the at least one speech segment extracted in step 203 to generate the second audio frame feature. The second audio frame feature may include, but not limited to, at least one of the following: a Fbank feature, an LPCC feature, and an MFCC feature. As an example, the above execution subject may generate the second audio frame feature in the manner similar to the manner of generating the first audio frame feature generated in step 201. As another example, when the first audio frame feature and the second audio frame feature have the same form, the above execution subject may directly select a corresponding audio frame feature from the generated first audio frame feature to generate the second audio frame feature.

Step two, the second audio frame feature is input into a pre-trained acoustic model, so as to obtain a second number of phoneme sequences to be matched corresponding to the second audio frame feature, and a corresponding score.

In these implementations, the above execution subject may input the second audio frame feature into the pre-trained acoustic model, so as to obtain the second number of phoneme sequences to be matched corresponding to the second audio frame feature, and the corresponding score. The above acoustic model may include various models for performing acoustic state determination in speech recognition. As an example, the above acoustic model may output a phoneme corresponding to the second audio frame feature, and the corresponding probability. Then, the above execution subject may determine, on the basis of a Viterbi algorithm, the second number of phoneme sequences with a highest probability corresponding to the second audio frame feature, and the corresponding score.

Optionally, the above acoustic model may be obtained by training through the following steps:

S1, a second training sample set is acquired.

In these implementations, an execution subject used for training the acoustic model may acquire the second training sample set by means of a wired or wireless connection mode. Second training samples in the above second training sample set may include second sample audio frame features and corresponding sample text. The above second sample audio frame features may be obtained by extracting features of second sample audios. The above sample text may be used for representing contents of the second sample audios. The above sample text may be a phoneme sequence directly acquired, for example, "nihao". The above sample text may also be a phoneme sequence converted from text (e.g., Chinese characters) based on a preset dictionary library.

S2, an initial acoustic model is acquired.

In these implementations, the above execution subject may acquire the initial acoustic model by means of a wired or wireless connection mode. The initial acoustic model may include various neural networks for determining an acoustic state, for example, an RNN, a BiLSTM and a DFSMN. As an example, the above initial acoustic model may be a network of a 30-layer DFSMN structure. Each layer of the DFSMN structure may consist of a hidden layer and a memory module. The last layer of the above network may be constructed on the basis of a softmax function, and the number of output units included in the network may be the same as the number of recognizable phonemes.

S3, the second sample audio frame features in the second training sample set are taken as inputs of the initial acoustic model, phonemes indicated by the sample text corresponding to the input second sample audio frame features are taken as desired outputs, and the initial acoustic model is pre-trained based on a first training criterion.

In these implementations, the above execution subject may take the second sample audio frame features in the second training sample set that are acquired in step S1 as the inputs of the initial acoustic model, take syllables indicated by the sample text corresponding to the input second sample audio frame features as desired outputs, and pre-train the initial acoustic model on the basis of the first training criterion. The first training criterion may be generated on the basis of the audio frame sequence. As an example, the above first training criterion may include a Connectionist Temporal Classification (CTC) criterion.

S4, the phonemes indicated by second sample text are converted into phoneme labels for a second training criterion by using a predetermined window function.

In these implementations, the above execution subject may convert the phonemes indicated by second sample text acquired in step S1 into the phoneme labels for the second training criterion by using the predetermined window function. The above window function may include, but not limited to, at least one of the following: a rectangular window and a triangular window. The above second training criterion may be generated on the basis of the audio frames, for example, the CE criterion. As an example, the phoneme indicated by the above second sample text may be "nihao"; and the above execution subject may use the predetermined window function to convert the phoneme into "nnniihhao".

S5, the second sample audio frame features in the second training sample set are taken as inputs of the pre-trained initial acoustic model, the phoneme labels corresponding to the input second sample audio frame features are taken as desired outputs, and the second training criterion is used to train the pre-trained initial acoustic model, so as to obtain the acoustic model.

In these implementations, the above execution subject may take, as the inputs of the initial acoustic model pre-trained in step S3, the second sample audio frame features in the second training sample set that are acquired in step S1, take, as desired outputs, the phoneme labels that are subjected to conversion in step S4 and correspond to the input second sample audio frame features, and use the above second training criterion to adjust parameters of the pre-trained initial acoustic model, so as to obtain the acoustic model.

On the basis of the above optional implementations, the above execution subject may reduce the workload of sample labeling and guarantee the validity of the model obtained through training by means of the coordination between a training criterion (for example, the CTC criterion) generated on the basis of a sequence dimension and a training criterion (for example, the CE criterion) generated on the basis of a frame dimension.

At step three, the second number of phoneme sequences to be matched are inputted into a pre-trained language model, so as to obtain text to be matched corresponding to the second number of phoneme sequences to be matched, and a corresponding score.

In these implementations, the above execution subject may input the second number of phoneme sequences to be matched that is obtained in step two into the pre-trained language model, so as to obtain the text to be matched corresponding to the second number of phoneme sequences to be matched, and the corresponding score. The above language model may output the text to be matched respectively corresponding to the second number of phoneme sequences to be matched, and the corresponding score. The above score is generally positively correlated with the probability of occurrence in a preset corpus and the degree of grammaticality.

At step four, according to the scores respectively corresponding to the obtained phoneme sequences to be matched and the text to be matched, text to be matched is selected from the obtained text to be matched as matching text corresponding to the at least one speech segment.

In these implementations, according to the scores respectively corresponding to the obtained phoneme sequences to be matched and the text to be matched, the above execution subject may select, from the obtained text to be matched and in various manners, the text to be matched as the matching text corresponding to the at least one speech segment. As an example, the above execution subject may first select a phoneme sequence to be matched of which score corresponding to the obtained phoneme sequence to be matched is greater than a first predetermined threshold. Then, the above execution subject may select, from the selected phoneme sequence to be matched, text to be matched with the highest score corresponding to the selected text to be matched as matching text corresponding to the speech segment corresponding to the phoneme sequence to be matched.

Optionally, according to the scores respectively corresponding to the obtained phoneme sequences to be matched and the text to be matched, the above execution subject may further select, from the obtained text to be matched and by means of the following steps, the text to be matched as the matching text corresponding to the at least one speech segment.

S1, weighted summation is performed on the scores respectively corresponding to the obtained phoneme sequences to be matched and the text to be matched to generate a total score corresponding to each piece of text to be matched.

In these implementations, the above execution subject may perform weighted summation on the scores respectively corresponding to the obtained phoneme sequences to be matched corresponding to the same speech segment and the text to be matched to generate a total score corresponding to each text to be matched. As an example, the scores corresponding to the phoneme sequences to be matched “nihao” and “niao” corresponding to the speech segment 001 may respectively be 82 and 60. The scores corresponding to the text to be matched “你好” (it represents 2 Chinese characters whose Pinyin is “ni” and “hao”) and “拟好” (it represents 2 Chinese characters whose Pinyin is “ni” and “hao”) corresponding to the phoneme sequence to be matched “nihao” may respectively be 95 and 72. The scores corresponding to the text to be matched “鸟” (it represents 1 Chinese character whose Pinyin is “niao”) and “你啊哦” (it represents 3 Chinese characters whose Pinyin is “ni”, “a” and “o”) corresponding to the phoneme sequence to be matched “niao” may respectively be 67 and 55. Assuming that weights of the score corresponding to the phoneme sequence to be matched and the score corresponding to the text to be matched may respectively be 30% and 70%, the above execution subject may determine that the total score corresponding to “你好” is 82*30%+95*70%=91.1; and the above execution subject may determine that the total score corresponding to “鸟” is 60*30%+67*70%=64.9.

S2, text to be matched with the highest total score is selected from the obtained text to be matched as the matching text corresponding to the at least one speech segment.

In these implementations, the above execution subject may select, from the text to be matched that is obtained in step S1, the text to be matched with the highest total score as the matching text corresponding to the at least one speech segment.

On the basis of the above optional implementations, the above execution subject may assign, according to an actual application scenario, different weights to the scores respectively corresponding to the obtained phoneme sequence to be matched and the text to be matched, so as to better adapt different application scenarios.

At step five, recognition text corresponding to the audio data to be recognized is generated based on the selected matching text.

In these implementations, according to the matching text selected in step four, the above execution subject may generate, in various manners, the recognition text corresponding to the audio data to be recognized. As an example, the above execution subject may arrange the selected matching text according to the sequence of the corresponding speech segments in the audio data to be recognized, and perform post-processing on the text to generate the recognition text corresponding to the above audio data to be recognized.

On the basis of the above optional implementations, the above execution subject may generate the recognition text from two dimensions of the phoneme sequence and the language model, so as to improve the recognition accuracy.

Figure 3:
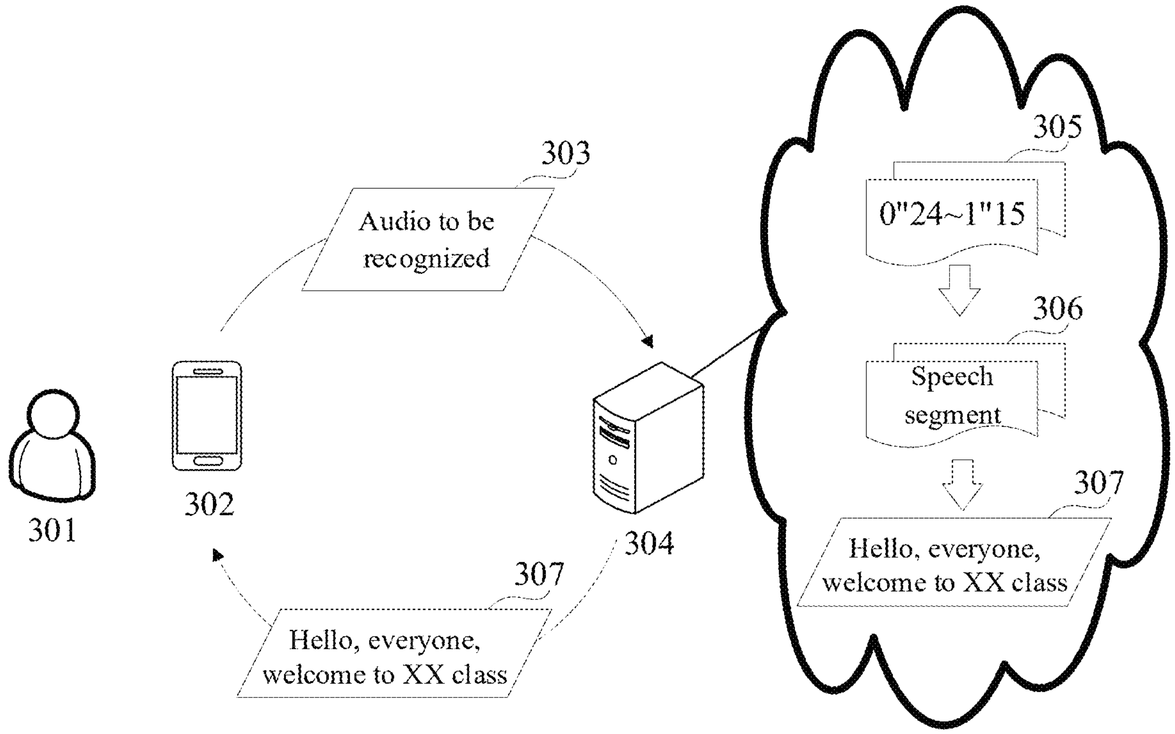
FIG. 3 is a schematic diagram of an application scenario of a method for speech recognition according to an embodiment of the disclosure.

Continuously referring to FIG. 3, FIG. 3 is a schematic diagram of an application scenario of a method for speech recognition according to an embodiment of the disclosure. In the application scenario of FIG. 3, a user 301 uses a terminal device 302 to record an audio as an audio 303 to be recognized. A backend server 304 acquires the audio 303 to be recognized. Then, the backend server 304 may determine a start and end time 305 of a speech segment included in the above audio 303 to be recognized. For example, a start moment and a stop moment of a speech segment A may respectively be 0"24 and 1"15. Based on the determined start and end time 305 of the speech segment, the backend server 304 may extract at least one speech segment 306 from the audio 303 to be recognized. For example, audio frames corresponding to 0"24-1"15 in the audio 303 to be recognized may be extracted as the speech segments. Then, the backend server 304 may perform speech recognition on the extracted speech segment 306 to generate recognition text 307 corresponding to the audio 303 to be recognized. For example, the recognition text 307 may be “Hello, everyone, welcome to XX class”, which is formed by combining recognition text corresponding to a plurality of speech segments. Optionally, the backend server 304 may further feed the generated recognition text 307 back to the terminal device 302.

Currently, one of the related arts is usually to directly perform speech recognition on the acquired audio. Since the audio often includes non-speech contents, the consumption of excessive resources is caused during feature extraction and speech recognition, and the accuracy of speech recognition is adversely affected. According to the method provided by the above embodiment of the disclosure, by means of extracting the speech segment from the audio data to be recognized based on the start and end time corresponding to the determined speech segment, the speech included in an original audio is extracted into the speech segments. Furthermore, speech recognition speed is also improved by integrating the recognition results of the extracted speech segments to generate the corresponding recognition text for the entire audio, thus allowing for parallel recognition of each speech segment.

Figure 4:
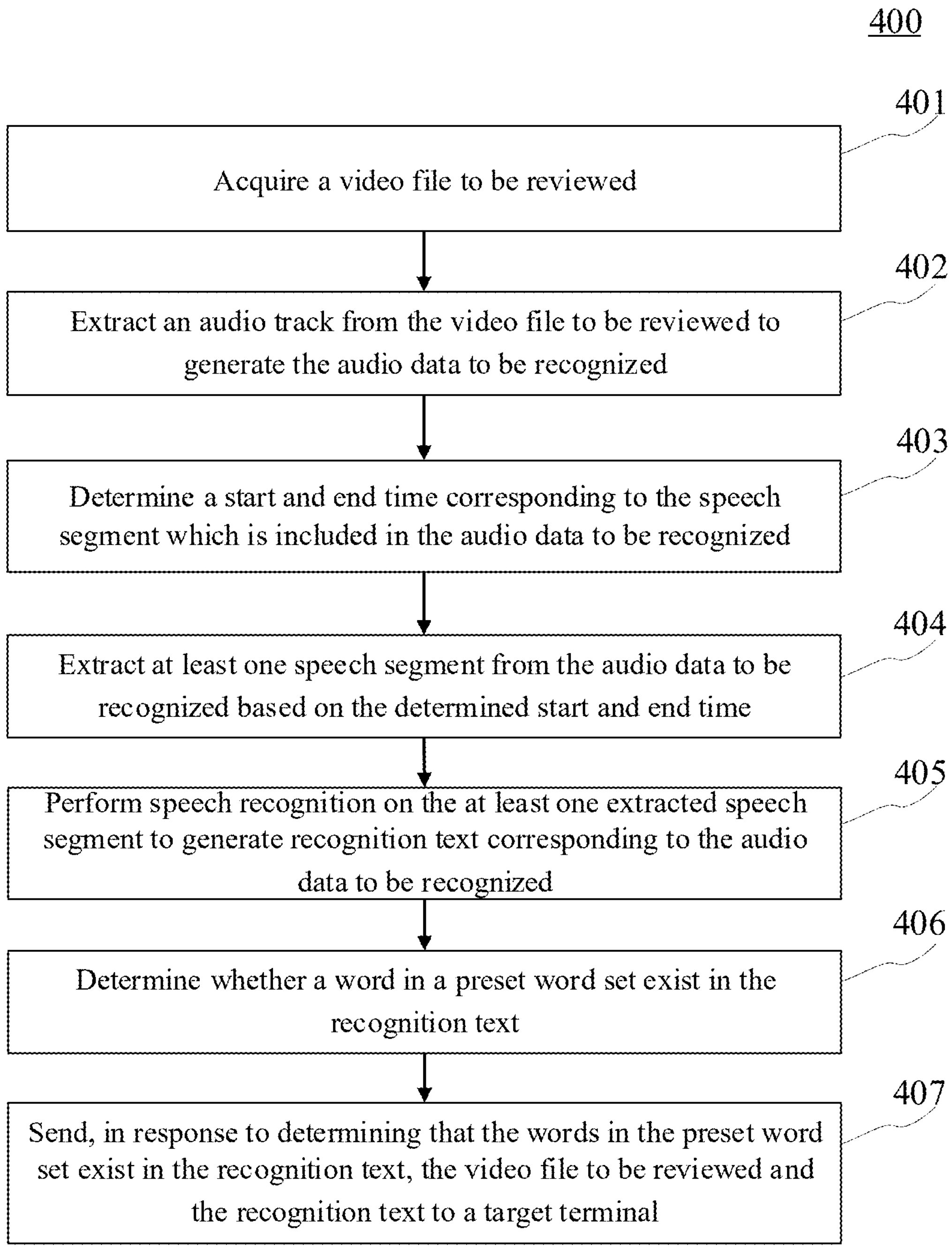
FIG. 4 is a flowchart of another embodiment of a method for speech recognition according to the disclosure.

Further referring to FIG. 4, showing a flow 400 of another embodiment of a method for speech recognition. The flow 400 of the method for speech recognition includes the following steps:

step 401, a video file to be reviewed is acquired.

In this embodiment, an execution subject (for example, the server 105 shown in FIG. 1) of the method for speech recognition may acquire, in various manners, the video file to be reviewed from a locally or communicatively connected electronic device (for example, the terminal devices 101, 102 and 103 shown in FIG. 1). The file to be reviewed may be, for example, a streaming video of a live streaming platform, or may be a submission video of a short-video platform.

Step 402, an audio track is extracted from the video file to be reviewed to generate the audio data to be recognized.

In this embodiment, the above execution subject may extract, in various manners, the audio track from the video file to be reviewed that is acquired in step 401 to generate the audio data to be recognized. As an example, the above execution subject may convert the extracted audio track into an audio file with a predetermined format as the audio data to be recognized.

Step 403, a start and end time corresponding to the speech segment which is included in the audio data to be recognized is determined.

Step 404 at least one speech segment is extracted from the audio data to be recognized based on the determined start and end time.

Step 405, speech recognition is performed on the at least one extracted speech segment to generate recognition text corresponding to the audio data to be recognized.

Step 403, step 404 and step 405 are respectively the same as step 202, step 203 and step 204 in the foregoing embodiments; descriptions for step 202, step 203 and step 204 and optional implementations thereof are also suitable for step 403, step 404 and step 405, which will not be repeated here.

Step 406, whether a word in a preset word set exist in the recognition text is determined.

In this embodiment, the above execution subject may determine, in various manners, whether the words in the preset word set exist in the recognition text generated in step 405. The preset word set may include a preset sensitive word set. The sensitive word set may include, for example, advertising language, uncivilized language, and the like.

In some optional implementations of this embodiment, the above execution subject may determine whether the words in the preset word set exist in the recognition text according to the following steps:

Step one, the words in the preset word set are split into a third number of retrieval units.

In these implementations, the above execution subject may split the words in the preset word set into the third number of retrieval units. As an example, the words in the preset word set may include “time-limited sec-killing”, and the above execution subject may split, by using a word segmentation technology, the “time-limited sec-killing” into “time-limited” and “sec-killing” as retrieval units.

Step two, based on the number of words in the recognition text that match the retrieval units, whether the words in the preset word set exist in the recognition text is determined.

In these implementations, the above execution subject may first match the recognition text generated in step 405 and the retrieval units, so as to determine the number of the retrieval units matched. Then, based on the determined number of the retrieval units, the above execution subject may determine, in various manners, whether the words in the preset word set exist in the recognition text. As an example, in response to the determined number of the retrieval units corresponding to the same word being greater than 1, the above execution subject may determine whether the words in the preset word set exist in the recognition text.

Optionally, the execution subject may further determine, in response to determining that all retrieval units belonging to the same word in the preset word set exist in the recognition text, that the words in the preset word set exist in the recognition text.

On the basis of the above optional implementations, the above execution subject may achieve fuzzy matching of search words, such that the strength of reviewing is improved.

In some optional implementations of this embodiment, the words in the preset word set may correspond to risk level information. The risk level information may be used for representing different levels of urgency, for example, a priority processing level, a sequential processing level, and the like.

step 407, in response to determining that the words in the preset word set exist in the recognition text, the video file to be reviewed and the recognition text are sent to a target terminal.

In this embodiment, in response to determining that the words in the preset word set exist in the recognition text generated in step 405, the execution subject may send the video file to be reviewed and the recognition text to the target terminal in various manners. As an example, the above target terminal may be a terminal used for double-checking the video to be reviewed, for example, a manual reviewing terminal or a terminal for reviewing keywords by using other reviewing technologies. As another example, the above target terminal may also be a terminal sending the video file to be reviewed, so as to remind a user using the terminal to adjust the video file to be reviewed.

In some optional implementations of this embodiment, on the basis of the words in the preset word set corresponding to the risk level information, the execution subject may send the video file to be reviewed and the recognition text to the target terminal according to the following steps:

step one, in response to determining that the word in the preset word set exist in the recognition text, risk level information corresponding to the matched word is determined.

In these implementations, in response to determining that the words in the preset word set exist in the recognition text, the above execution subject may determine the risk level information corresponding to the matched word.

Step two, the video file to be reviewed and the recognition text are sent to a terminal matching the determined risk level information.

In these implementations, the above execution subject may send the video file to be reviewed and the recognition text to the terminal matching the determined risk level information. As an example, the above execution subject may send the video file to be reviewed corresponding to the risk level information for representing priority processing, and the recognition text to the terminal for priority processing. As another example, the above execution subject may store the video file to be reviewed corresponding to the risk level information for representing sequential processing, and the recognition text into a queue to be reviewed. Then, the video file to be reviewed and the recognition text are selected from the above queue to be reviewed, and are sent to the terminal for double-checking.

On the basis of the above optional implementations, the above execution subject may perform staged processing on the video file to be reviewed of keywords triggering different risk levels, thereby improving processing efficiency and flexibility.

From FIG. 4, it can be seen that, the flow 400 of the method for speech recognition in this embodiment shows the step of extracting audios from the video file to be reviewed, and the step of sending, in response to determining that the words in the preset word set exist in the recognition text corresponding to the extracted audios, the video file to be reviewed and the recognition text to the target terminal. Therefore, according to the solution described in this embodiment, by means of only sending videos that hit specific words to the target terminal which is used for double-checking of the contents of the videos, the reviewing quantity of the videos may be significantly reduced, thereby effectively improving the efficiency of video reviewing. Furthermore, by means of converting speeches included in a video file into the recognition text for content reviewing of the video file, compared with the listening of audios frame by frame, hit specific words can be positioned more quickly, such that the dimension of video reviewing can be enriched, and reviewing efficiency can also be improved.

Figure 5:
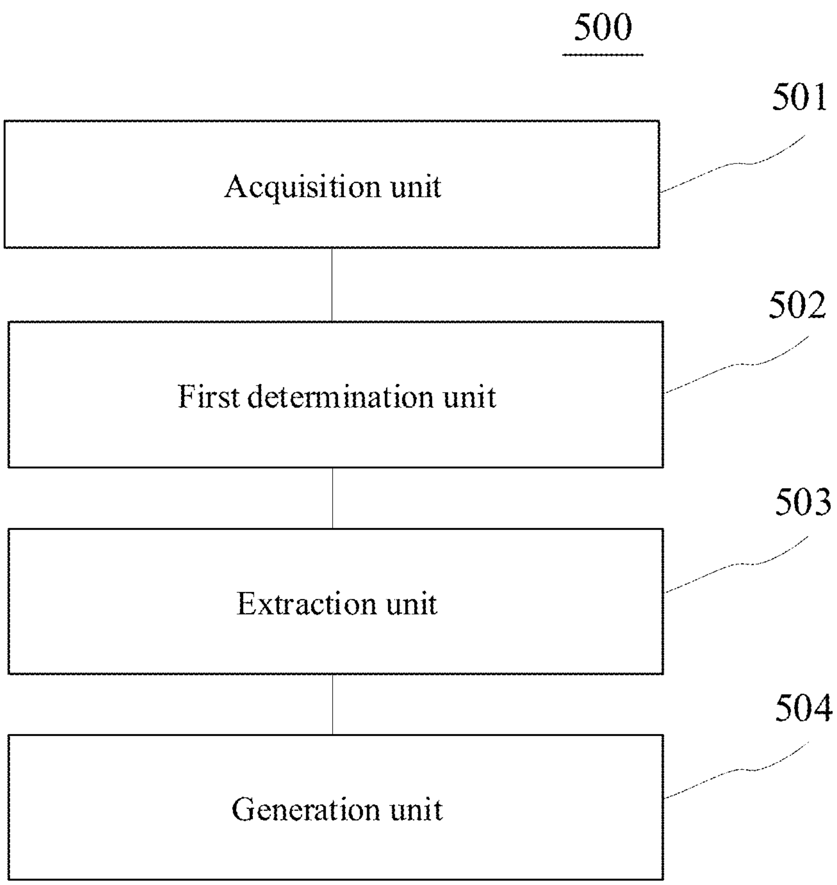
FIG. 5 is a schematic structural diagram of an embodiment of an apparatus for speech recognition according to the disclosure.

Further referring to FIG. 5, as an implementation of the method shown in each figure, the disclosure provides an embodiment of an apparatus for speech recognition. The apparatus embodiment corresponds to the method embodiments shown in FIG. 2 or FIG. 4. The apparatus may be specifically applied to various electronic devices.

As shown in FIG. 5, the apparatus 500 for speech recognition provided in this embodiment includes an acquisition unit 501, a first determination unit 502, an extraction unit 503 and a generation unit 504. The acquisition unit 501 is configured to acquire an audio data to be recognized, where the audio data to be recognized includes a speech segment. The first determination unit 502 is configured to determine a start and end time corresponding to the speech segment which is included in the audio data to be recognized. The extraction unit 503 is configured to extract at least one speech segment from the audio data to be recognized based on the determined start and end time. The generation unit 504 is configured to perform speech recognition on the at least one extracted speech segment to generate recognition text corresponding to the audio data to be recognized.

In this embodiment, in the apparatus 500 for speech recognition, specific processing of the acquisition unit 501, the first determination unit 502, the extraction unit 503 and the generation unit 504, and the brought technical effects thereof may respectively refer to related descriptions of step 201, step 202, step 203 and step 204 in the corresponding embodiments in FIG. 2, which will not be repeated here.

In some optional implementations of this embodiment, the above first determination unit 502 may include a first determination sub-unit (not shown in the figure) and a first generation sub-unit (not shown in the figure). The above first determination sub-unit may be configured to determine a probability that an audio frame corresponding to the first audio frame feature belongs to a speech. The above first generation sub-unit may be configured to generate, based on comparison between the determined probability and a predetermined threshold, the start and end time corresponding to the speech segment.

In some optional implementations of this embodiment, the above first determination sub-unit may be further configured to input the first audio frame feature into a pre-trained speech detection model, and generate the probability that the audio frame corresponding to the first audio frame feature belongs to a speech.

In some optional implementations of this embodiment, the above speech detection model may be obtained by training the following steps: a first training sample set is acquired; an initial speech detection model for classification is acquired; and the first sample audio frame features in the first training sample set are taken as inputs of the initial speech detection model, labeling information corresponding to the input first audio frame features is taken as desired outputs, and the speech detection model is obtained by means of training. First training samples in the first training sample set include first sample audio frame features and corresponding sample labeling information; the first sample audio frame features are obtained by extracting features of first sample audios; and the sample labeling information is used for representing a category to which the first sample audios belong, and the category includes a speech.

In some optional implementations of this embodiment, the above first generation sub-unit may include a first selection module (not shown in the figure), a determination module (not shown in the figure), and a first generation module (not shown in the figure). The above first selection module may be configured to use a preset sliding window to select probability values corresponding to a first number of audio frames. The above determination module may be configured to determine a statistical value of the selected probability values. The above first generation module may be configured to generate, in response to determining that the statistical value is greater than the predetermined threshold, and according to an audio fragment consisting of the first number of audio frames corresponding to the selected probability values, the start and end time corresponding to the speech segment.

In some optional implementations of this embodiment, the above generation unit 504 may include a second generation sub-unit (not shown in the figure), a third generation sub-unit (not shown in the figure), a fourth generation sub-unit (not shown in the figure), a selection sub-unit (not shown in the figure), and a fifth generation sub-unit (not shown in the figure). The above second generation sub-unit may be configured to extract a frame feature of a speech from the at least one extracted speech segment to generate a second audio frame feature. The above third generation sub-unit may be configured to input the second audio frame feature into a pre-trained acoustic model, so as to obtain a second number of phoneme sequences to be matched corresponding to the second audio frame feature, and a corresponding score. The above fourth generation sub-unit may be configured to input the second number of phoneme sequences to be matched into a pre-trained language model, so as to obtain text to be matched corresponding to the second number of phoneme sequences to be matched, and a corresponding score. The above selection sub-unit may be configured to select, according to the scores respectively corresponding to the obtained phoneme sequences to be matched and the text to be matched, text to be matched as matching text corresponding to the at least one speech segment from the obtained text to be matched. The above fifth generation sub-unit may be configured to generate, according to the selected matching text, recognition text corresponding to the audio data to be recognized.

In some optional implementations of this embodiment, the above acoustic model may be obtained by training through the following steps: a second training sample set is acquired; an initial acoustic model is acquired; the second sample audio frame features in the second training sample set are taken as inputs of the initial acoustic model, phonemes indicated by the sample text corresponding to the input second sample audio frame features are taken as desired outputs, and the initial acoustic model is pre-trained on the basis of a first training criterion; the phonemes indicated by second sample text are converted into phoneme labels for a second training criterion by using a predetermined window function; and the second sample audio frame features in the second training sample set are taken as inputs of the pre-trained initial acoustic model, the phoneme labels corresponding to the input second sample audio frame features are taken as desired outputs, and the second training criterion is used to train the pre-trained initial acoustic model, so as to obtain the acoustic model. Second training samples in the second training sample set may include second sample audio frame features and corresponding sample text; the second sample audio frame features are obtained by extracting features of second sample audio; the sample text is used for representing the contents of the second sample audios; the first training criterion is generated on the basis of an audio frame sequence; and the second training criterion is generated on the basis of an audio frame.

In some optional implementations of this embodiment, the above selection sub-unit may include a second generation module (not shown in the figure) and a second selection module (not shown in the figure). The above second generation module may be configured to perform weighted summation on the scores respectively corresponding to the obtained phoneme sequences to be matched and the text to be matched to generate a total score corresponding to each text to be matched. The above second generation module may be configured to select, from the obtained text to be matched, text to be matched with the highest total score as the matching text corresponding to the at least one speech segment.

In some optional implementations of this embodiment, the above acquisition unit 501 may include an acquisition sub-unit (not shown in the figure) and a sixth generation sub-unit (not shown in the figure). The above acquisition sub-unit may be configured to acquire a video file to be reviewed. The above sixth generation sub-unit may be configured to extract an audio track from the video file to be reviewed to generate the audio data to be recognized. The above apparatus for speech recognition may further include a second determination unit (not shown in the figure) and a sending unit (not shown in the figure). The above second determination unit may be configured to determine whether words in a preset word set exist in the recognition text. The above sending unit may be configured to send, in response to determining that the words in the preset word set exist in the recognition text, the video file to be reviewed and the recognition text to a target terminal.

In some optional implementations of this embodiment, the above second determination unit may include a splitting sub-unit (not shown in the figure) and a second determination sub-unit (not shown in the figure). The splitting sub-unit may be configured to split the words in the preset word set into a third number of retrieval units. The above second determination sub-unit may be configured to determine, based on the number of words in the recognition text that match the retrieval units, whether the words in the preset word set exist in the recognition text.

In some optional implementations of this embodiment, the above second determination sub-unit may further be configured to determine, in response to determining that all retrieval units belonging to the same word in the preset word set exist in the recognition text, that the words in the preset word set exist in the recognition text.

In some optional implementations of this embodiment, the words in the above preset word set may correspond to risk level information. The above sending unit may include a third determination sub-unit (not shown in the figure) and a sending sub-unit (not shown in the figure). The above third determination sub-unit may be configured to determine, in response to determining that the words in the preset word set exist in the recognition text, risk level information corresponding to the matched words. The above sending sub-unit may be configured to send the video file to be reviewed and the recognition text to a terminal matching the determined risk level information.

According to the apparatus provided by the above embodiment of the disclosure, the speech segment is extracted from the audio data to be recognized by means of the extraction unit 503 according to the start and end time corresponding to the speech segment determined by the first determination unit 502, such that the speech is separated from an original audio. Furthermore, recognition results of all extracted speech segments extracted by the extraction unit 503 are further integrated by means of the generation unit 504 to generate recognition text corresponding to an entire audio, thus allowing for parallel recognition of each speech segment, thereby increasing the speed of speech recognition.

Figure 6:
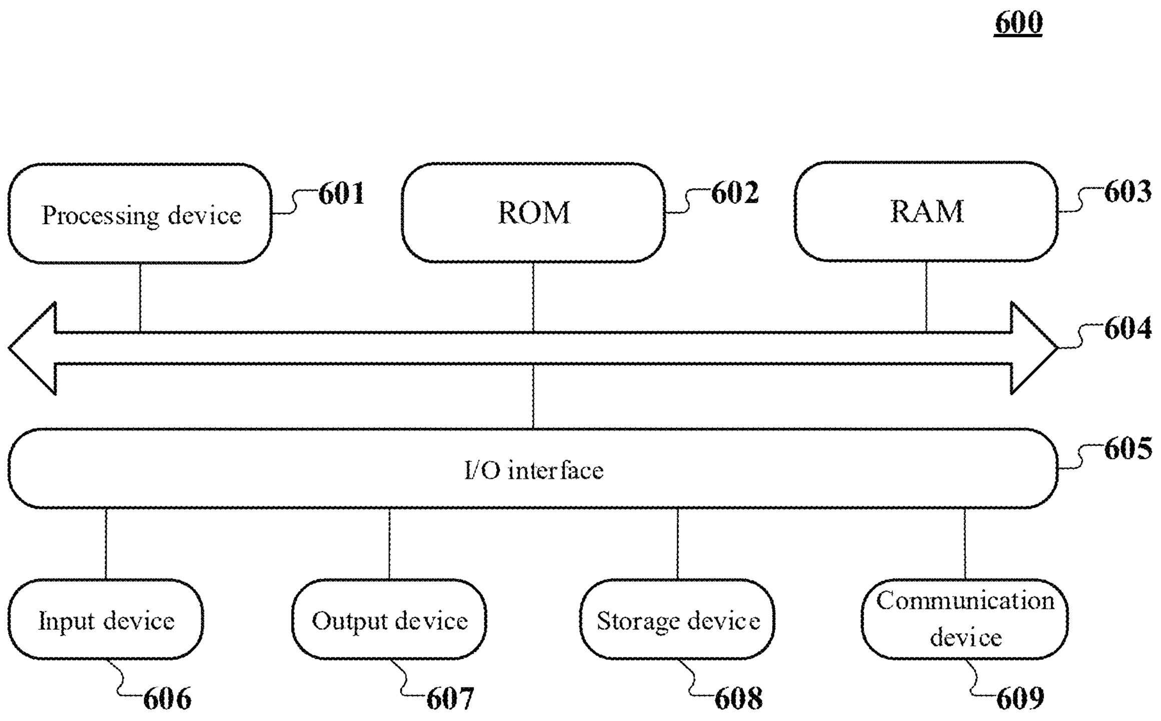
FIG. 6 is a schematic structural diagram of an electronic device suitable for implementing an embodiment of the disclosure.

Referring now to FIG. 6, a structural schematic diagram of electronic device 600 (such as the server shown in FIG. 1) suitable for implementing an embodiment of the disclosure is shown. The terminal equipment in the embodiment of the present disclosure can include, but is not limited to, mobile terminals such as a mobile phone, a notebook computer, a digital broadcast receiver, a personal digital assistant (PDA), a Pad, a portable media player (PMP) and a vehicle-mounted terminal (e.g., vehicle-mounted navigation terminal), and fixed terminals such as a digital TV and a desktop computer. The terminal equipment shown in FIG. 6 is only an example, and should not bring any restrictions on the functions and application scope of the embodiments of the present disclosure.

As shown in FIG. 6, the terminal equipment 600 can comprise a processing device (e.g., central processing unit, graphics processor, etc.) 601, which can perform various appropriate actions and processing according to a program stored in a read-only memory (ROM) 602 or a program loaded into a random access memory (RAM) 603 from a storage device 608. In the RAM 603, various programs and data required for the operation of the terminal equipment 600 are also stored. The processing device 601, the ROM 602, and the RAM 603 are connected through a bus 604. An Input/Output (I/O) interface 605 is also connected to the bus 604.

Generally, the following devices can be connected to the I/O interface 605: an input device 606 such as a touch screen, a touch pad, a keyboard, a mouse, a camera, a microphone, an accelerometer, and a gyroscope; an output device 607 such as a liquid crystal display (LCD), a speaker and a vibrator; a storage device 608 such as a magnetic tape and a hard disk; and a communication device 609. The communication device 609 can allow the terminal equipment 600 to perform wireless or wired communication with other equipment to exchange data. Although FIG. 6 shows the terminal equipment 600 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure comprise a computer program product comprising a computer program carried by a computer-readable medium, and the computer program contains program codes for executing the method shown in the flowcharts. In such embodiment, the computer program can be downloaded and installed from a network through the communication device 609, or installed from the storage device 608, or installed from the ROM 602. When the computer program is executed by the processing device 601, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device, or component. In the disclosure, the computer-readable signal medium can comprise a data signal propagated in a baseband or as part of a carrier wave, in which computer-readable program codes are carried. This propagated data signal can take various forms, including but not limited to an electromagnetic signal, an optical signal, or any suitable combination of the above. The computer-readable signal medium can also be any computer-readable medium other than the computer-readable storage medium, and the computer-readable signal medium can send, propagate, or transmit the program for use by or in connection with the instruction execution system, device, or component. The program codes contained in the computer-readable medium can be transmitted by any suitable medium, including but not limited to electric wire, optical cable, radio frequency (RF) or any suitable combination of the above.

The above computer-readable storage medium may be included in the above electronic device or may be present separately and not assembled into that electronic device. The above computer-readable storage medium stores program instructions that upon execution by a processor, cause the electronic device to: acquire an audio data to be recognized, the audio data to be recognized comprising a speech segment; determine a start and end time corresponding to the speech segment which is comprised in the audio data to be recognized; extract at least one speech segment from the audio data to be recognized based on the determined start and end time; and perform speech recognition on the at least one extracted speech segment to generate recognition text corresponding to the audio data to be recognized.

Computer program codes for performing the operations of the disclosure can be written in one or more programming languages or a combination thereof, including object-oriented programming languages such as JAVA®, SMALLTALK®, C++, and conventional procedural programming languages such as "C" language or similar programming languages. The program code can be completely or partially executed on a user computer, executed as an independent software package, partially executed on a user computer, and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions, and operations of possible implementations of systems, methods, and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The described units may also be provided in a processor, which may, for example, be described as: a processor comprising an acquisition unit, a first determination unit, an extraction unit, a generation unit. The name of a module or unit does not constitute a limitation to the module or unit itself under certain circumstances. For example, the acquisition unit can also be described as "a unit for acquiring an audio data to be recognized, the audio data to be recognized comprising a speech segment".

In some embodiments, the disclosure further provides a method for speech recognition, comprising: acquiring an audio data to be recognized, the audio data to be recognized comprising a speech segment; determining a start and end time corresponding to the speech segment which is comprised in the audio data to be recognized; extracting at least one speech segment from the audio data to be recognized based on the determined start and end time; and performing speech recognition on the at least one extracted speech segment to generate recognition text corresponding to the audio data to be recognized.

In some embodiments, the determining a start and end time corresponding to the speech segment which is comprised in the audio data to be recognized comprises: extracting an audio frame feature of the audio data to be recognized to generate a first audio frame feature; determining a probability that an audio frame corresponding to the first audio frame feature belongs to a speech; and generating, based on comparison between the determined probability and a predetermined threshold, the start and end time corresponding to the speech segment.

In some embodiments, the determining a probability that an audio frame corresponding to the first audio frame feature belongs to a speech comprises: inputting the first audio frame feature into a pre-trained speech detection model, and generating the probability that the audio frame corresponding to the first audio frame feature belongs to the speech.

In some embodiments, the speech detection model is obtained by training through the following steps: acquiring a first training sample set, wherein first training samples in the first training sample set comprise first sample audio frame features and corresponding sample labeling information, the first sample audio frame features are obtained by extracting features of first sample audios, the sample labeling information is used for representing a category to which the first sample audios belong, and the category comprises a speech; acquiring an initial speech detection model for classification; and taking the first sample audio frame features in the first training sample set as inputs of the initial speech detection model, taking labeling information corresponding to the input first audio frame features as desired outputs, so as to obtain the speech detection model by training.

In some embodiments, the generating, based on comparison between the determined probability and a predetermined threshold, the start and end time corresponding to the speech segment comprises: using a preset sliding window to select probability values corresponding to a first number of audio frames; determining a statistical value of the selected probability values; and generating, in response to determining that the statistical value is greater than the predetermined threshold, the start and end time corresponding to the speech segment based on an audio segment consisting of the first number of audio frames corresponding to the selected probability values.

In some embodiments, the performing speech recognition on the at least one extracted speech segment to generate recognition text corresponding to the audio data to be recognized comprises: extracting a frame feature of a speech from the at least one extracted speech segment to generate a second audio frame feature; inputting the second audio frame feature into a pre-trained acoustic model, so as to obtain a second number of phoneme sequences to be matched corresponding to the second audio frame feature, and a corresponding score; inputting the second number of phoneme sequences to be matched into a pre-trained language model, so as to obtain text to be matched corresponding to the second number of phoneme sequences to be matched, and a corresponding score; selecting, based on the scores respectively corresponding to the obtained phoneme sequences to be matched and the text to be matched, text to be matched as matching text corresponding to the at least one speech segment from the obtained text to be matched; and generating, based on the selected matching text, the recognition text corresponding to the audio data to be recognized.

In some embodiments, the acoustic model is obtained by training through the following steps: acquiring a second training sample set, wherein second training samples in the second training sample set comprise second sample audio frame features and corresponding sample text, the second sample audio frame features are obtained by extracting features of second sample audio, and the sample text is used for representing contents of the second sample audios; acquiring an initial acoustic model; taking the second sample audio frame features in the second training sample set as inputs of the initial acoustic model, taking phonemes indicated by the sample text corresponding to the input second sample audio frame features as desired outputs, and pre-training the initial acoustic model on the basis of a first training criterion, wherein the first training criterion is generated on the basis of an audio frame sequence; converting the phonemes indicated by second sample text into phoneme labels for a second training criterion by using a predetermined window function, wherein the second training criterion is generated on the basis of an audio frame; and taking the second sample audio frame features in the second training sample set as inputs of the pre-trained initial acoustic model, taking the phoneme labels corresponding to the input second sample audio frame features as desired outputs, and using the second training criterion to train the pre-trained initial acoustic model, so as to obtain the acoustic model.

In some embodiments, the selecting, based on the scores respectively corresponding to the obtained phoneme sequences to be matched and the text to be matched, text to be matched as matching text corresponding to the at least one speech segment from the obtained text to be matched, comprises: performing weighted summation on the scores respectively corresponding to the obtained phoneme sequences to be matched and the text to be matched to generate a total score corresponding to each piece of text to be matched; and selecting, from the obtained text to be matched, text to be matched with a highest total score as the matching text corresponding to the at least one speech segment.

In some embodiments, the acquiring an audio data to be recognized comprises: acquiring a video file to be reviewed; and extracting an audio track from the video file to be reviewed to generate the audio data to be recognized; and the method further comprises: determining whether a word in a preset word set exist in the recognition text; and sending, in response to determining that the word in the preset word set exist in the recognition text, the video file to be reviewed and the recognition text to a target terminal.

In some embodiments, the determining whether a word in a preset word set exist in the recognition text comprises: splitting the words in the preset word set into a third number of retrieval units; and determining, based on the number of words in the recognition text that match the retrieval units, whether a word in the preset word set exist in the recognition text.

In some embodiments, the determining, based on the number of words in the recognition text that match the retrieval units, whether a word in the preset word set exist in the recognition text comprises: determining, in response to determining that all retrieval units associated with the same word in the preset word set exist in the recognition text, that the word in the preset word set exist in the recognition text.

In some embodiments, the words in the preset word set correspond to risk level information, and the sending, in response to determining that the word in the preset word set exist in the recognition text, the video file to be reviewed and the recognition text to a target terminal comprises: determining, in response to determining that the word in the preset word set exist in the recognition text, risk level information corresponding to the matched word; and sending the video file to be reviewed and the recognition text to a terminal matching the determined risk level information.

In some embodiments, the disclosure provides an apparatus for speech recognition, comprising: an acquisition unit, configured to acquire an audio data to be recognized, wherein the audio data to be recognized comprises a speech segment; a first determination unit, configured to determine a start and end time corresponding to the speech segment which is comprised in the audio data to be recognized; an extraction unit, configured to extract at least one speech segment from the audio data to be recognized based on the determined start and end time; and a generation unit, configured to perform speech recognition on the at least one extracted speech segment to generate recognition text corresponding to the audio data to be recognized.

In some embodiments, the above first determination unit includes: a first determination sub-unit, configured to determine a probability that an audio frame corresponding to the first audio frame feature belongs to a speech; and a first generation sub-unit, configured to generate, based on comparison between the determined probability and a predetermined threshold, the start and end time corresponding to the speech segment.

In some embodiments, the above first determination sub-unit may be further configured to input the first audio frame feature into a pre-trained speech detection model, and generate the probability that the audio frame corresponding to the first audio frame feature belongs to a speech.

In some embodiments, the above speech detection model may be obtained by training the following steps: a first training sample set is acquired; an initial speech detection model for classification is acquired; and the first sample audio frame features in the first training sample set are taken as inputs of the initial speech detection model, labeling information corresponding to the input first audio frame features is taken as desired outputs, and the speech detection model is obtained by means of training. First training samples in the first training sample set include first sample audio frame features and corresponding sample labeling information; the first sample audio frame features are obtained by extracting features of first sample audios; and the sample labeling information is used for representing a category to which the first sample audios belong, and the category includes a speech.

In some optional implementations of this embodiment, the above first generation sub-unit may include: a first selection module, configured to use a preset sliding window to select probability values corresponding to a first number of audio frames; a determination module, configured to determine a statistical value of the selected probability values; and a first generation module, configured to generate, in response to determining that the statistical value is greater than the predetermined threshold, the start and end time corresponding to the speech segment based on an audio fragment consisting of the first number of audio frames corresponding to the selected probability values.

In some embodiments, the above generation unit includes: a second generation sub-unit, configured to extract a frame feature of a speech from the at least one extracted speech segment to generate a second audio frame feature; a third generation sub-unit, configured to input the second audio frame feature into a pre-trained acoustic model, so as to obtain a second number of phoneme sequences to be matched corresponding to the second audio frame feature, and a corresponding score; a fourth generation sub-unit, configured to input the second number of phoneme sequences to be matched into a pre-trained language model, so as to obtain text to be matched corresponding to the second number of phoneme sequences to be matched, and a corresponding score; a selection sub-unit, configured to select, based on the scores respectively corresponding to the obtained phoneme sequences to be matched and the text to be matched, text to be matched as matching text corresponding to the at least one speech segment from the obtained text to be matched; and a fifth generation sub-unit, configured to generate, based on the selected matching text, recognition text corresponding to the audio data to be recognized.

In some embodiments, the above acoustic model may be obtained by training through the following steps: a second training sample set is acquired; an initial acoustic model is acquired; the second sample audio frame features in the second training sample set are taken as inputs of the initial acoustic model, phonemes indicated by the sample text corresponding to the input second sample audio frame features are taken as desired outputs, and the initial acoustic model is pre-trained on the basis of a first training criterion; the phonemes indicated by second sample text are converted into phoneme labels for a second training criterion by using a predetermined window function; and the second sample audio frame features in the second training sample set are taken as inputs of the pre-trained initial acoustic model, the phoneme labels corresponding to the input second sample audio frame features are taken as desired outputs, and the second training criterion is used to train the pre-trained initial acoustic model, so as to obtain the acoustic model. Second training samples in the second training sample set may include second sample audio frame features and corresponding sample text; the second sample audio frame features are obtained by extracting features of second sample audio; the sample text is used for representing the contents of the second sample audios; the first training criterion is generated on the basis of an audio frame sequence; and the second training criterion is generated on the basis of an audio frame.

In some embodiments, the above selection sub-unit may include: a second generation module, configured to perform weighted summation on the scores respectively corresponding to the obtained phoneme sequences to be matched and the text to be matched to generate a total score corresponding to each text to be matched; and a second generation module may be configured to select, from the obtained text to be matched, text to be matched with the highest total score as the matching text corresponding to the at least one speech segment.

In some embodiments, the above acquisition unit may include: an acquisition sub-unit, configured to acquire a video file to be reviewed; a sixth generation sub-unit, configured to extract an audio track from the video file to be reviewed to generate the audio data to be recognized. And the above apparatus for speech recognition may further include: a second determination unit, configured to determine whether words in a preset word set exist in the recognition text; and a sending unit, configured to send, in response to determining that the words in the preset word set exist in the recognition text, the video file to be reviewed and the recognition text to a target terminal.

In some embodiments, the above second determination unit may include: a splitting sub-unit, configured to split the words in the preset word set into a third number of retrieval units; and a second determination sub-unit, configured to determine, based on the number of words in the recognition text that match the retrieval units, whether the words in the preset word set exist in the recognition text.

In some embodiments, the above second determination sub-unit may further be configured to determine, in response to determining that all retrieval units belonging to the same word in the preset word set exist in the recognition text, that the word in the preset word set exist in the recognition text.

In some embodiments, words in the above preset word set may correspond to risk level information. The above sending unit may include: a third determination sub-unit, configured to determine, in response to determining that the words in the preset word set exist in the recognition text, risk level information corresponding to the matched words; and a sending sub-unit, configured to send the video file to be reviewed and the recognition text to a terminal matching the determined risk level information.

In some embodiments, the disclosure provides an electronic device, comprising: at least one processor; and at least one memory communicatively coupled to the at least one processor and storing instructions that upon execution by the at least one processor cause the processor to perform the above method for speech recognition.

In some embodiments, the disclosure provides a computer-readable medium, storing program instructions that upon execution by a processor, cause the processor to perform the above method for speech recognition.

The above description is only a preferred embodiment of the present disclosure and an illustration of the technical principles employed. It should be understood by those skilled in the art that the scope of the disclosure covered by the embodiments of the present disclosure is not limited to technical solutions resulting from particular combinations of the technical features described above, but should also cover other technical solutions resulting from any combination of the technical features described above or their equivalents without departing from the above conception of the present disclosure, such as technical solutions resulting from the interchangeability of the above features with technical features having similar functions disclosed in (but not limited to) the embodiments of the present disclosure.

What is claimed is:

1. A method for improving speech recognition, comprising:

- acquiring an audio data to be recognized;
- extracting at least one audio feature from the audio data, wherein the at least one audio feature comprises at least one of a filter-bank feature, a linear predictive cepstral coefficient, or a Mel-frequency cepstral coefficient;
- inputting the extracted at least one audio feature into a first pre-trained machine learning model to determine a start and end time corresponding to at least one speech segment in the audio data, wherein the first pre-trained machine learning model is configured to generate the start and end time based on the extracted at least one audio feature;
- extracting the at least one speech segment from the audio data based on the determined start and end time;
- generating phoneme sequences associated with the extracted at least one speech segment based on inputting the extracted at least one speech segment into a second pre-trained machine learning model;
- generating recognition text corresponding to the audio data based on inputting the phoneme sequences associated with the extracted at least one speech segment into a third pre-trained machine learning model,
- wherein second pre-trained machine learning model is configured to generate a number of phoneme sequences to be matched corresponding to the extracted at least one audio feature and a corresponding score, and wherein the method further comprises:
- inputting the number of phoneme sequences to be matched into the third pre-trained machine learning model, so as to obtain text to be matched corresponding to the number of phoneme sequences to be matched, and the corresponding score;
- selecting, based on the scores respectively corresponding to the obtained phoneme sequences to be matched and the text to be matched, text to be matched as matching text corresponding to the at least one speech segment from the obtained text to be matched; and
- generating, based on the selected matching text, the recognition text corresponding to the audio data.

2. The method according to claim 1, wherein the first pre-trained machine learning model is configured to generate the start and end time based on:

- determining a probability that an audio frame corresponding to the at least one audio feature belongs to a speech; and
- generating, based on comparison between the determined probability and a predetermined threshold, the start and end time corresponding to the at least one speech segment.

3. The method according to claim 2, wherein the generating, based on comparison between the determined probability and a predetermined threshold, the start and end time corresponding to the at least one speech segment comprises:

- using a preset sliding window to select probability values corresponding to a first number of audio frames;
- determining a statistical value of the selected probability values; and
- generating, in response to determining that the statistical value is greater than the predetermined threshold, the start and end time corresponding to the at least one speech segment based on an audio segment consisting of the first number of audio frames corresponding to the selected probability values.

4. The method according to claim 1, wherein the first pre-trained machine learning model is obtained by training through the following steps:

- acquiring a first training sample set, wherein first training samples in the first training sample set comprise first sample audio frame features and corresponding sample labeling information, the first sample audio frame features are obtained by extracting features of first sample audios, the sample labeling information is used for representing a category to which the first sample audios belong, and the category comprises a speech;
- acquiring an initial speech detection model for classification; and
- taking the first sample audio frame features in the first training sample set as inputs of the initial speech detection model, taking labeling information corresponding to the input first audio frame features as desired outputs, so as to obtain the first pre-trained machine learning model.

5. The method according to claim 1, wherein the second pre-trained machine learning model is obtained by training through the following steps:

acquiring a second training sample set, wherein second training samples in the second training sample set comprise second sample audio frame features and corresponding sample text, the second sample audio frame features are obtained by extracting features of second sample audio, and the sample text is used for representing contents of the second sample audios;

acquiring an initial acoustic model;

taking the second sample audio frame features in the second training sample set as inputs of the initial acoustic model, taking phonemes indicated by the sample text corresponding to the input second sample audio frame features as desired outputs, and pre-training the initial acoustic model on the basis of a first training criterion, wherein the first training criterion is generated on the basis of an audio frame sequence;

converting the phonemes indicated by second sample text into phoneme labels for a second training criterion by using a predetermined window function, wherein the second training criterion is generated on the basis of an audio frame; and taking the second sample audio frame features in the second training sample set as inputs of the pre-trained initial acoustic model, taking the phoneme labels corresponding to the input second sample audio frame features as desired outputs, and using the second training criterion to train the pre-trained initial acoustic model, so as to obtain the second pre-trained machine learning model.

6. The method according to claim 1, wherein the selecting, based on the scores respectively corresponding to the obtained phoneme sequences to be matched and the text to be matched, text to be matched as matching text corresponding to the at least one speech segment from the obtained text to be matched, comprises:

performing weighted summation on the scores respectively corresponding to the obtained phoneme sequences to be matched and the text to be matched to generate a total score corresponding to each piece of text to be matched; and selecting, from the obtained text to be matched, text to be matched with a highest total score as the matching text corresponding to the at least one speech segment.

7. The method according to claim 1, wherein the acquiring an audio data to be recognized comprises:

acquiring a video file to be reviewed; and extracting an audio track from the video file to be reviewed to generate the audio data to be recognized; and the method further comprises:

determining whether a word in a preset word set exist in the recognition text; and sending, in response to determining that the word in the preset word set exist in the recognition text, the video file to be reviewed and the recognition text to a terminal.

8. The method according to claim 7, wherein the determining whether a word in a preset word set exist in the recognition text comprises:

splitting the words in the preset word set into a third number of retrieval units; and determining, based on the number of words in the recognition text that match the retrieval units, whether a word in the preset word set exist in the recognition text.

9. The method according to claim 8, wherein the determining, based on the number of words in the recognition text that match the retrieval units, whether a word in the preset word set exist in the recognition text comprises:

determining, in response to determining that all retrieval units associated with the same word in the preset word set exist in the recognition text, that the word in the preset word set exist in the recognition text.

10. The method according to claim 7, wherein the words in the preset word set correspond to risk level information, and wherein the sending, in response to determining that the word in the preset word set exist in the recognition text, the video file to be reviewed and the recognition text to the terminal comprises:

determining, in response to determining that the word in the preset word set exist in the recognition text, risk level information corresponding to the matched word; and sending the video file to be reviewed and the recognition text to the terminal matching the determined risk level information.

11. An electronic device, comprising:

at least one processor; and at least one memory communicatively coupled to the at least one processor and storing instructions that upon execution by the at least one processor cause the processor to perform operations comprising:

acquiring an audio data to be recognized;

extracting at least one audio feature from the audio data, wherein the at least one audio feature comprises at least one of a filter-bank feature, a linear predictive cepstral coefficient, or a Mel-frequency cepstral coefficient;

inputting the extracted at least one audio feature into a first pre-trained machine learning model to determine a start and end time corresponding to at least one speech segment in the audio data, wherein the first pre-trained machine learning model is configured to generate the start and end time based on the extracted at least one audio feature;

extracting the at least one speech segment from the audio data based on the determined start and end time;

generating phoneme sequences associated with the extracted at least one speech segment based on inputting the extracted at least one speech segment into a second pre-trained machine learning model;

generating recognition text corresponding to the audio data based on inputting the phoneme sequences associated with the extracted at least one speech segment into a third pre-trained machine learning model, wherein second pre-trained machine learning model is configured to generate a number of phoneme sequences to be matched corresponding to the extracted at least one audio feature and a corresponding score, and wherein the operations further comprise:

inputting the number of phoneme sequences to be matched into the third pre-trained machine learning model, so as to obtain text to be matched corresponding to the number of phoneme sequences to be matched, and the corresponding score;

selecting, based on the scores respectively corresponding to the obtained phoneme sequences to be matched and the text to be matched, text to be matched as matching text corresponding to the at least one speech segment from the obtained text to be matched; and generating, based on the selected matching text, the recognition text corresponding to the audio data.

12. The electronic device according to claim 11, wherein the acquiring an audio data to be recognized comprises:

acquiring a video file to be reviewed; and extracting an audio track from the video file to be reviewed to generate the audio data to be recognized; and the method further comprises:

determining whether a word in a preset word set exist in the recognition text; and sending, in response to determining that the word in the preset word set exist in the recognition text, the video file to be reviewed and the recognition text to a terminal.

13. The electronic device according to claim 12, wherein the words in the preset word set correspond to risk level information, and wherein the sending, in response to determining that the word in the preset word set exist in the recognition text, the video file to be reviewed and the recognition text to the terminal comprises:

determining, in response to determining that the word in the preset word set exist in the recognition text, risk level information corresponding to the matched word; and sending the video file to be reviewed and the recognition text to the terminal matching the determined risk level information.

14. A non-transitory computer-readable medium, storing program instructions that upon execution by a processor, cause the processor to perform operations comprising:

acquiring an audio data to be recognized;

extracting at least one audio feature from the audio data, wherein the at least one audio feature comprises at least one of a filter-bank feature, a linear predictive cepstral coefficient, or a Mel-frequency cepstral coefficient;

inputting the extracted at least one audio feature into a first pre-trained machine learning model to determine a start and end time corresponding to at least one speech segment in the audio data, wherein the first pre-trained machine learning model is configured to generate the start and end time based on the extracted at least one audio feature;

extracting the at least one speech segment from the audio data based on the determined start and end time;

generating phoneme sequences associated with the extracted at least one speech segment based on inputting the extracted at least one speech segment into a second pre-trained machine learning model;

generating recognition text corresponding to the audio data based on inputting the phoneme sequences associated with the extracted at least one speech segment into a third pre-trained machine learning model, wherein second pre-trained machine learning model is configured to generate a number of phoneme sequences to be matched corresponding to the extracted at least one audio feature and a corresponding score, and wherein the operations further comprise:

inputting the number of phoneme sequences to be matched into the third pre-trained machine learning model, so as to obtain text to be matched corresponding to the number of phoneme sequences to be matched, and the corresponding score;

selecting, based on the scores respectively corresponding to the obtained phoneme sequences to be matched and the text to be matched, text to be matched as matching text corresponding to the at least one speech segment from the obtained text to be matched; and generating, based on the selected matching text, the recognition text corresponding to the audio data.

15. The non-transitory computer-readable medium according to claim 14, wherein the acquiring an audio data to be recognized comprises:

acquiring a video file to be reviewed; and extracting an audio track from the video file to be reviewed to generate the audio data to be recognized; and the method further comprises:

determining whether a word in a preset word set exist in the recognition text; and sending, in response to determining that the word in the preset word set exist in the recognition text, the video file to be reviewed and the recognition text to a terminal.

* * * * *